United States Patent [19]

Kwok

[11] Patent Number: 5,929,902
[45] Date of Patent: *Jul. 27, 1999

[54] METHOD AND APPARATUS FOR INVERSE TELECINE PROCESSING BY FITTING 3:2 PULL-DOWN PATTERNS

[75] Inventor: Wilson Kwok, San Jose, Calif.

[73] Assignee: C-Cube Microsystems, Milpitas, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/608,038

[22] Filed: Feb. 28, 1996

[51] Int. Cl.⁶ .................................................. H04N 5/253
[52] U.S. Cl. ............................ 348/96; 348/459; 348/700; 386/129; 386/131
[58] Field of Search ................................ 348/700, 96, 97, 348/110, 112, 441, 443, 459; 386/4, 52, 64, 131, 46, 55, 95, 129; H04N 5/253

[56] References Cited

U.S. PATENT DOCUMENTS

| | | | |
|---|---|---|---|
| 4,567,531 | 1/1986 | Tabata | 386/95 |
| 4,709,277 | 11/1987 | Ninomiya et al. | 386/52 |
| 4,786,979 | 11/1988 | Claus et al. | 386/129 |
| 4,901,161 | 2/1990 | Giovanella | 386/129 |
| 4,972,274 | 11/1990 | Becker et al. | 386/55 |
| 5,027,205 | 6/1991 | Avis et al. | 348/441 |
| 5,083,860 | 1/1992 | Miyatake et al. | 352/129 |
| 5,191,427 | 3/1993 | Richards et al. | 348/97 |
| 5,428,399 | 6/1995 | Robinson et al. | 348/459 |
| 5,446,497 | 8/1995 | Keating et al. | 348/443 |
| 5,517,248 | 5/1996 | Isoda | 348/459 |
| 5,563,651 | 10/1996 | Christopher et al. | 348/97 |
| 5,565,998 | 10/1996 | Coombs et al. | 386/46 |

Primary Examiner—Tommy P. Chin
Assistant Examiner—Y. Lee
Attorney, Agent, or Firm—Proskauer Rose LLP

[57] ABSTRACT

The invention provides methods and apparatus for performing inverse telecine processing on an input video frame sequence to be encoded. A method well-suited for detelecine of film-only telecine in MPEG-1 or MPEG-2 applications includes the steps of attempting to fit known 3:2 pulldown pattern phases to the entire sequence, determining a likely edit point in the sequence if a known phase cannot be fit to the sequence, and recursively repeating the fitting and edit point determination steps on subsequences until the entire sequence is partitioned into subsequences which can be fit with one of the known phases. The phases fit to the sequence or subsequences are then used to generate field-match indicators which are further processed to generate MPEG-1 or MPEG-2 compliant repeat field codes.

21 Claims, 7 Drawing Sheets

METHOD AND APPARATUS FOR INVERSE TELECINE PROCESSING BY FITTING 3:2 PULL-DOWN PATTERNS

FIELD OF THE INVENTION

The present invention relates to inverse telecine processing for detecting repeat fields in a sequence of video fields such that the repeat fields can be dropped before the sequence is encoded using video encoding standards such as MPEG-1 or MPEG-2.

BACKGROUND OF THE INVENTION

FIG. 1 shows an exemplary video encoding system 12 in which a sequence of frames are supplied from a video source 14. The sequence of frames may be progressive or interlaced. A progressive sequence may have a frame rate on the order of 30 frames per second with a single field in each frame. An interlaced sequence generally includes two fields in each frame and therefore will include 60 fields per second at a 30 frames per second frame rate. The interlaced sequence includes an even field corresponding to even scan lines and an odd field corresponding to odd scan lines.

The video source 14 may be any digital video signal source such as a video camera or a telecine machine. A conventional telecine machine converts film with a frame rate of 24 frames per second into a 60 field per second digital video signal using a 3:2 pulldown technique. The 3:2 pulldown technique generates two video fields for a given film frame, three video fields for the next film frame, two fields for the next frame and so on in an alternating 3,2,3, 2,3,2, ... pattern. For a film frame which is converted into three video fields, the third field is a repeat of the first field. The 3:2 pulldown technique is discussed in greater detail below in connection with FIG. 2.

The video encoding system 12 further includes a video capture buffer 16 for capturing the input video sequence and an inverse telecine circuit 18. The inverse telecine circuit 18 detects repeat fields in the input video sequence and causes these fields to be dropped so as not to waste valuable encoder resources on the compressing of repeat fields. The video encoding system 12 further includes an encoder 20 which may be an MPEG-1 or MPEG-2 compliant encoder. The encoder 20 includes a preprocessor buffer 22, a preprocessor 24, a video compression circuit 26, a rate buffer 28 and a controller 30.

The video compression circuit 26 receives a video signal from the preprocessor 24 in the form of a sequence of frames or fields and outputs a compressed digital video bit stream. The compressed digital video bit stream output by the video compression circuit 26 may comply with the syntax specified in video compression standards such as MPEG-1 or MPEG-2. Compression circuits which generate an MPEG-1 or MPEG-2 compliant bit stream are well known. The video bit stream generated by the video compression circuit 26 is stored in the rate buffer 28. The bit stream is then transmitted via a transmission channel 32 to one or more decoders which decode the received bit stream. Alternatively, the bit stream may be transmitted to an electronic or magnetic memory, a recordable optical disk or another suitable storage device.

The controller 30 controls the number of bits allocated by the video compression circuit 26 to the frames to be encoded. The controller 30 allocates bits to the frames to be encoded so as not to exceed the bandwidth in the channel 32 assigned to the encoding system 12 and so as to maintain certain limits on the occupancy of the rate buffer 28. This is turn prevents overflow and underflow conditions when the bit stream is received in a decoder buffer from the transmission channel 32 or from a storage device in which the bit stream has been previously stored.

The preprocessor 24 processes the video signal so that it may be compressed by the video compression circuit 26. For example, the preprocessor 24 may change the format of each frame including the number of horizontal or vertical pixels to meet parameters specified by the video compression circuit 16. In addition, the preprocessor 24 can detect scene changes or other changes which increase compression difficulty. A scene change increases the amount of bits required because predictive encoding cannot initially be used. If the preprocessor 24 detects a scene change, this information is communicated to the video compression circuit 26 and controller 30. A fade, representing a continuous decrease or increase in luminance level to or from black over several frames, can also cause difficulties for the video compression circuit 26 because it can cause a failure in motion compensated prediction. The preprocessor 24 can detect and inform the video compression circuit 26 of a fade so that the video compression circuit 26 can take appropriate precautions.

FIG. 2 shows a sequence of film frames at 24 frames per second labeled A, B, C, ... and a corresponding sequence of video fields at 60 fields per second derived from frames A, B, C, ... using the above-noted 3:2 pulldown technique. A telecine machine which performs 3:2 pulldown conversion alternates between generating three video fields and two video fields for successive film frames. When three video fields are generated for a given film frame, the third field is a repeat of the first field. Thus, as shown in FIG. 2, the first video field $a_1$ is an odd field derived from the first film frame A, the second video field $a_2$ is an even field derived from the film frame A, the third video field $a_3$ is an odd field which is the same as $a_1$ and is derived from the film frame A. The fourth video field $b_1$ is an even field derived from the film frame B and the fifth video field $b_2$ is an odd field derived from the film frame B. The sixth, seventh, and eighth video fields, $c_1$, $c_2$, $c_3$, are even, odd, and even, respectively, and are derived from the film frame C, with $c_3$ being a repeat of $c_1$. The ninth and tenth video fields $d_1$, $d_2$ are odd and even, respectively and are derived from the film frame D. Thus, the number of fields per frame of video follows the 3,2,3, 2,3,2, ... pattern commonly referred to as a 3:2 pulldown pattern.

The 3:2 pulldown pattern may be interrupted in a variety of situations. For example, there may be an edit operation in which a new film segment is combined with an old film segment. The edit operation may produce the following pattern in which the location of the edit is indicated by an arrow:

$$3, 2, 3, 2, 3, 3, 2, 3, 2, ...$$
$$\uparrow$$

In another situation, conventional video can be "spliced" into the 3:2 pulldown video sequence to form a pattern as follows:

$$...3, 2, 3, 2, 3, 2, \quad 2, 2, 2, 2, 2, ..., 2, 2, \quad 3, 2, 3, 2, 3, 2, ...$$

from film          video         from film

This situation occurs when a commercial is inserted into a 3:2 pulldown pattern derived from film. In other situations, there can be a purposeful deviation from the conventional 3:2 pulldown pattern to produce an eye-appealing pan.

Moreover, if slow motion is desired there may be repeat fields for optical reasons as well as repeat fields resulting from telecine machine operation.

The purpose of inverse telecine processing may thus be viewed as grouping fields into two-field frames and three-field frames by detecting repeat fields in the field sequence. The repeat fields in the three-field frames are then dropped so as not to waste encoder resources on the compression of repeat fields.

Conventional inverse telecine methods generally do not take full advantage of the availability of field statistics for surrounding fields in non real-time applications. As a result, a need exists for improved detection of repeat fields in a video sequence to be encoded.

SUMMARY OF THE INVENTION

The present invention provides methods and apparatus for analyzing a sequence of source telecine material for detection of repeat fields to be dropped during encoding. The detection process is generally referred to as inverse telecine or detelecine. The present invention is particularly advantageous in non real-time applications in which repeat field identification decisions can be based on statistics gathered for a relatively large window of surrounding fields.

A first embodiment of the invention is a method particularly well-suited for detelecine of mixed video and film telecine material for MPEG-2 compliant encoding. The method includes the steps of generating a vector of pixel difference scores for a given field in the sequence, dividing each difference score by its smallest adjacent score, filtering the result in a median-like filter, and correlating the divided and filtered scores with a reference vector characteristic of the sequence to generate a correlation metric. The correlation metric is then thresholded to provide a field-match indicator for the given field. These steps are repeated for the other fields in the frame sequence, and the resulting repeat field indicators are processed to provide repeat-first-field and top-field-first codes in accordance with the MPEG-2 standard. For source telecine material at 60 fields per second, the method can be used to provide an instantaneous encoding frame rate which is variable from 20 Hz for motionless stills to 24 Hz for film segments to 30 Hz for video segments.

A second embodiment of the invention is a method particularly well-suited for detelecine of film-only telecine material for either MPEG-1 or MPEG-2 compliant encoding. The method includes the steps of attempting to fit known 3:2 pulldown pattern phases to an entire frame sequence, determining a likely edit point in the sequence if a known phase cannot be fit to the sequence, and recursively repeating the fitting and edit point determination steps on subsequences until the entire sequence is partitioned into subsequences which either can be fit with one of the known phases or have no identifiable phase. The phases fit to the sequence or subsequences are then used to generate field-match indicators which are further processed to generate MPEG-1 or MPEG-2 compliant repeat field codes. In the case of MPEG-2 compliant encoding, the resulting frame rate is 24 Hz for source material at 60 fields per second except at transitional edit points where the 3:2 pulldown phase changes. In the case of MPEG-1 compliant encoding, the resulting frame rate is exactly 24 Hz for source telecine material at 60 fields per second. The method includes features for limiting the timing jitter between video and audio in MPEG-1 applications which is introduced by the transitional edit points where the 3:2 pulldown phase changes.

DETAILED DESCRIPTION OF THE INVENTION

Figure 1:
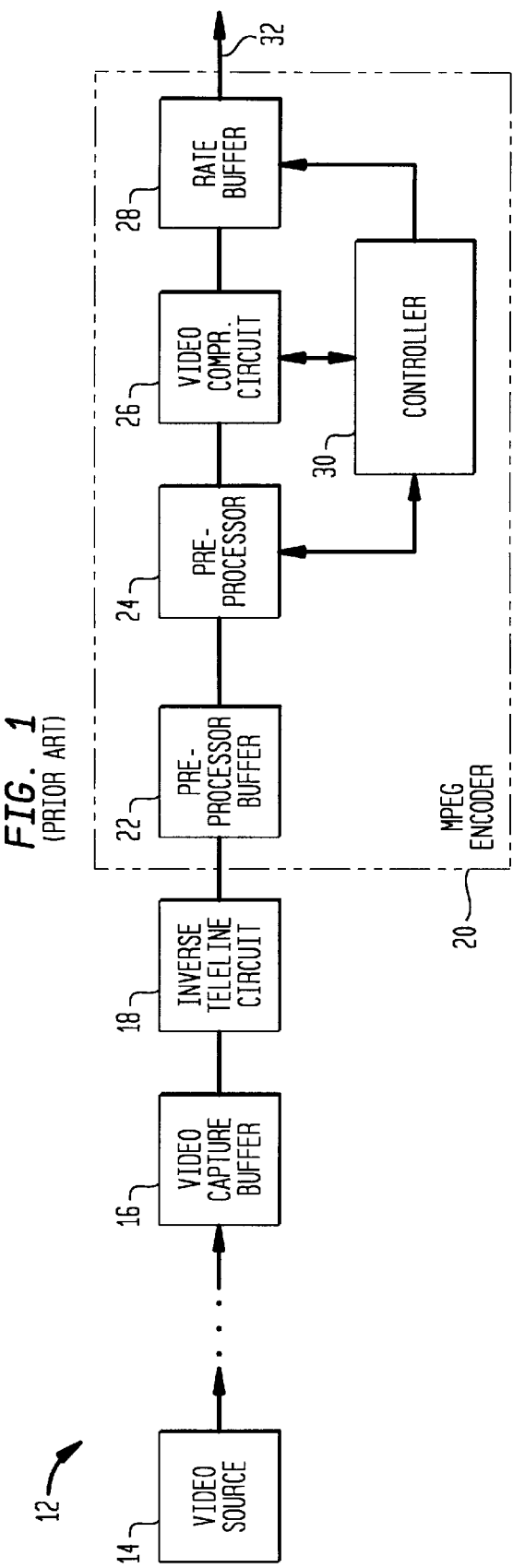
FIG. 1 is a block diagram of an exemplary video encoding system in accordance with the prior art.
Figure 2:
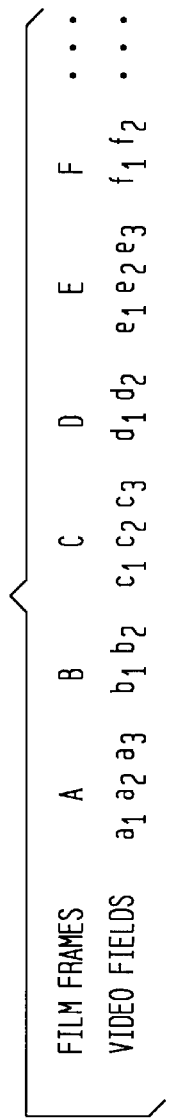
FIG. 2 illustrates a conventional 3:2 pulldown technique suitable for use in the inverse telecine circuit of the video encoding system of FIG. 2.
Figure 3A:
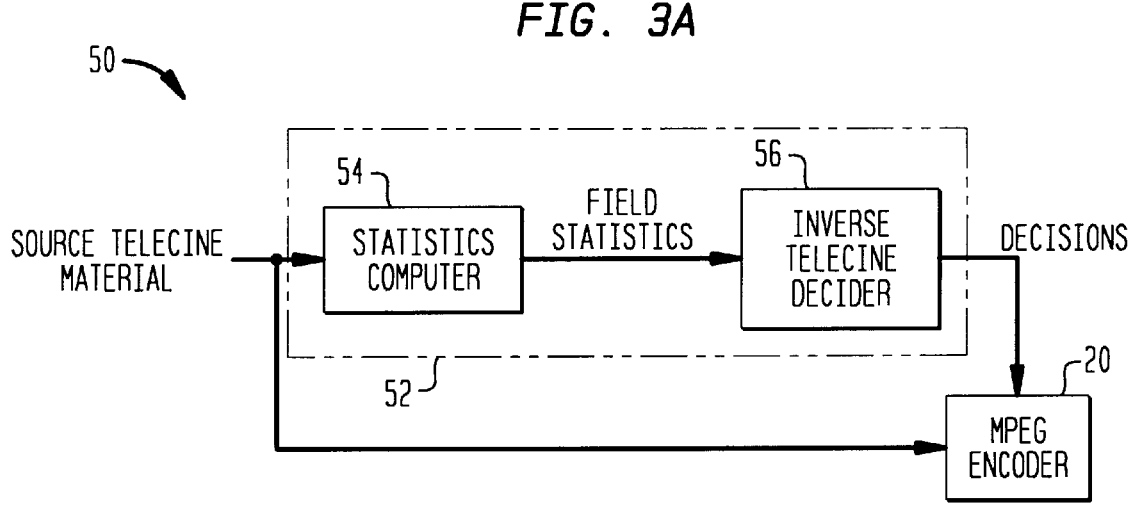
FIG. 3A is a block diagram of an exemplary video encoding system in accordance with the present invention.

FIG. 3A shows a block diagram of an exemplary video encoding system 50 in accordance with the invention. The system 50 includes an inverse telecine circuit 52 and an encoder 20 which in this embodiment is compliant with a video compression standard such as MPEG-1 or MPEG-2. The inverse telecine circuit 52 in this embodiment includes a statistics computer 54 and an inverse telecine decider 56. The statistics computer 54 generates field statistics using an input video signal which may comprise source telecine material generated using the above-described 3:2 pulldown technique. The field statistics include metrics designed to extract salient features from the large amount of pixel data that generally characterize repeat fields in the source telecine material. The inverse telecine decider 56 uses a combination of these field statistics to generate decisions regarding repeat fields. The decisions are used to direct the encoder 20 as to which pair of fields of the input video signal should be encoded together as a frame and which fields should be dropped.

The video encoding system 50 may operate in a real-time or non real-time mode. In real-time operation, inverse telecine may be considered a pre-processing stage of an encoding pipeline process. Because the number of field buffers available in a real-time system are limited in practice by memory capacity and throughput signal delay considerations, real-time inverse telecine decisions are generally based on statistics looking ahead only a few fields and statistics associated with past fields. In non real-time operation, multiple processing passes can be made over an entire sequence of source material. The inverse telecine decider 56 can then make decisions based on the statistics computation performed on the entire sequence, and can supply a telecine decision list for the entire sequence to the MPEG encoder 20. This allows non real-time detelecine methods to provide substantially improved decisions relative to detelecine methods that are subject to real-time constraints. Although the present invention is particularly well-suited for use in non real-time detelecine, it should be understood that many aspects of the invention can be readily applied to real-time detelecine.

Figure 3B:
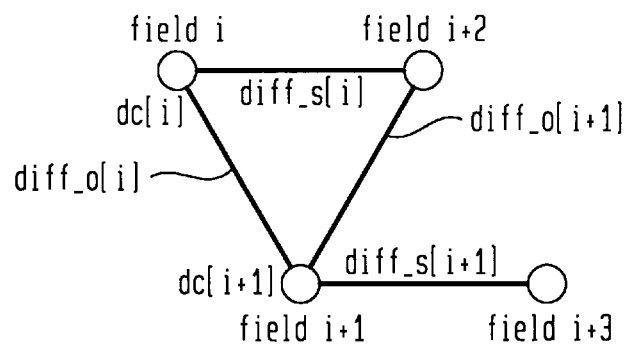
FIG. 3B illustrates exemplary field statistics suitable for use in the system of FIG. 3A.

FIG. 3B illustrates exemplary field statistics which may be generated by the statistics computer 54 of FIG. 3A for fields in the source telecine material. Fields i and i+2 denote adjacent even fields and fields i+1 and i+3 denote adjacent odd fields in an interlaced sequence of video frames. The exemplary statistics computed for a given field i include:

1. the sum of absolute pixel differences between the field i and its adjacent field of the same parity (denoted diff_s[i]);

2. the sum of absolute pixel differences between the field i and its adjacent field of the opposite parity (denoted diff_o[i]); and 3. the DC ("direct current") or average value of all pixels of the field i (denoted dc[i]).

These statistics may be generated for each of the fields within a given sequence of source telecine material using a computer, microprocessor, application specific integrated circuit (ASIC) or other digital data processor or a portion thereof suitably programmed to perform the specified sum, difference and averaging operations. The computed field statistics are supplied to the inverse telecine decider circuit 56.

It should be noted that it is possible to make inverse telecine decisions using less than all the pixel data of a given field. For example, although a given field may include one luma and two chroma components, the inverse telecine decision may be based on only the luma components. In addition, to reduce the amount of field data which needs to be processed, the inverse telecine processing may be carried out using decimated versions of the fields in particular applications.

Figure 4A:
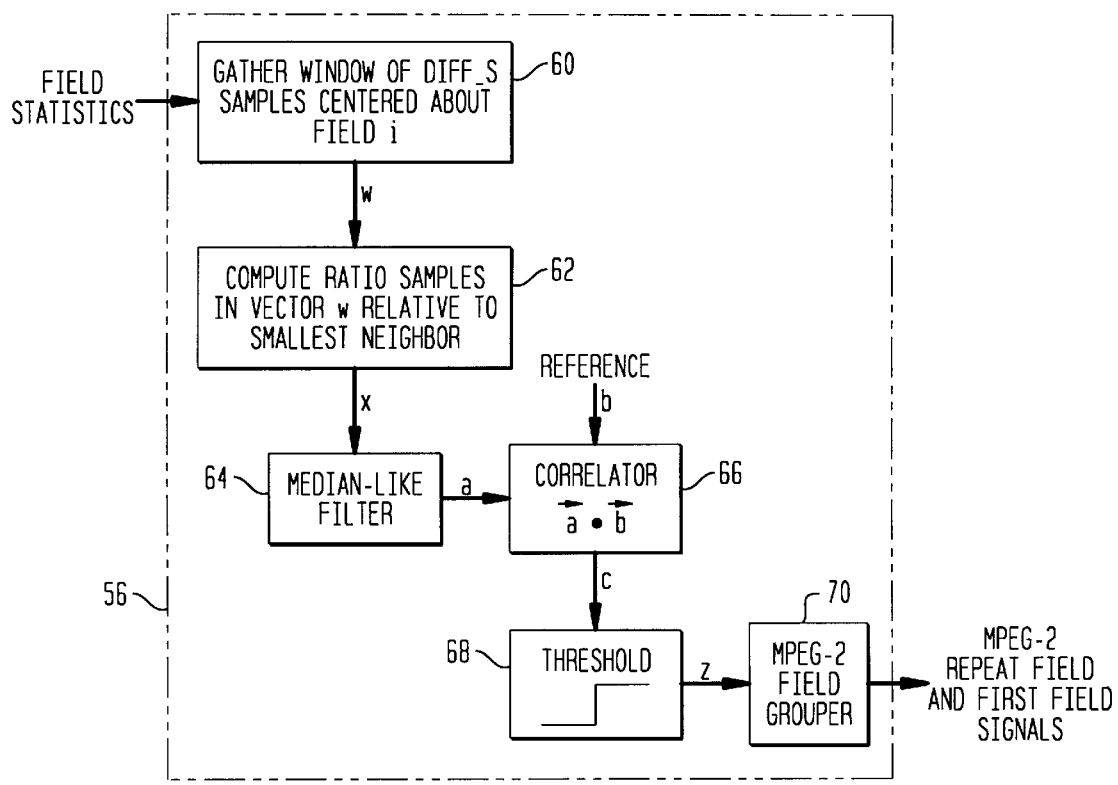
FIG. 4A is a bock diagram of an exemplary inverse telecine decider in accordance with a first exemplary embodiment of the invention.

FIG. 4A shows an exemplary inverse telecine decider 56 in accordance with a first embodiment of the invention. The exemplary decider 56 is particularly well-suited for detelecine of mixed video/film telecine material in MPEG-2 applications. The decider 56 uses the field statistics to decide if a given field i matches its adjacent same-parity field i+2. The field statistics are applied to a processing element 60 which gathers a predetermined number of diff_s samples centered about field i. The samples gathered in this embodiment are the 2T+3 samples falling within a window of same-parity difference scores from diff_s[i−T−1] through diff_s[i+T+1], where T defines the window size. The diff_s scores that have a value of zero or do not exist in the defined window because of boundary effects at the start and/or end of the video frame sequence are set to one by the processing element 60. The output of the processing element 60 is thus a sample vector w in which the elements are computed as:

$$w[j] = min(1, diff\_s[i-j])$$

for $j = -(T+1)$ to $(T+1)$.

The sample vector w is applied to another processing element 62 which generates a new vector x by dividing each sample in w by its adjacent smallest sample as follows:

$$x[j] = w[j]/min(w[j-1], w[j+1])$$

for $j = -T$ to T. The processing elements 60 and 62 may be part of the same computer or other digital data processor programmed to provide the above operations as well as other operations within the inverse telecine decider 56.

The vector x is then passed through a median-like filter 64 in which the elements of x are histogrammed and the smallest (2T/5)+1 samples are set to one while the other samples are set to zero. The output of the median-like filter 64 is a vector a with the following elements:

$$a[j] = 1.0, \text{ if } x[j] \text{ within } S$$
$$0.0, \text{ otherwise}$$

for $j = -T$ to T where S is the set of smallest (2T/5)+1 samples from vector x. The vector a is then correlated with a reference vector b in a correlator 66. The vector b is defined as:

$$b[j] = 1.0, \text{ if } (j \bmod 5) \text{ equals } 0$$
$$0.0, \text{ otherwise}$$

for $j = -T$ to T. The result of the correlation operation is a scalar correlation metric c[i] which is applied to a threshold element 68 and is thresholded to yield a binary field-match indicator z[i]. The value of z is computed as follows:

$$z = 1.0, \text{ if } c > \text{threshold}$$
$$0.0, \text{ otherwise}$$

A value of one for z indicates a match between field i and its adjacent same-parity field i+2, and a value of zero indicates no match.

The threshold may be determined through training on a source sequence with known true decisions, as determined manually by a detelecine operator. Given this training source sequence with corresponding known true decisions, the correlation metric c[i] is calculated for every field i in the sequence. Given a selected threshold t, one can then compute the conditional probability P{c<t | match}, which is the probability of observing a correlation result less than t given that the corresponding field was truly supposed to be a match. This is a measure of undetected drop error, or how often an error is made in declaring no match when the field was really supposed to be a match. One can also compute the conditional probability P{c>t | no match}, which is the probability of observing a correlation result greater than t given that the field was supposed to be no match. This is a measure of false drop error, or how often an error is made in declaring a match when the field was really supposed to be no match. The threshold t may then be selected as a tradeoff between the undetected drop error and the false drop error. For example, as t is increased, false drop errors become less likely but undetected drop errors become more likely. The threshold could therefore be selected as the smallest value of t which results in no false drop errors over a given training sequence. With an exemplary training sequence over a window size of {−20, +20}, a suitable threshold in one embodiment of the invention was selected as t=7.

The processing operations of elements 60–68 are repeated to yield a value for the field-match indicator z[i] for each field in the input source telecine sequence. However, the resulting sequence of z[i] values at the output of threshold element 68 may not yet be directly convertible to a legal sequence of MPEG-2 repeat field codes. The z[i] values generally must be processed to break some of the declared matches to resolve lone fields and other "odd" transitions.

The odd transitions may be introduced by telecine edit points or field match errors such as missed matches or falsely declared matches. This process is performed by the MPEG-2 field grouper 70. The field grouper 70 receives as an input the field-match values z[i] and determines which pairs of fields or groups of three consecutive fields constitute a frame for encoding.

Figure 4B:
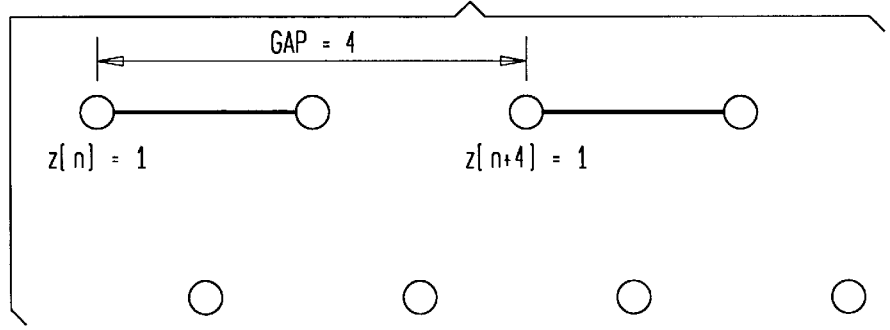
FIG. 4B illustrates a gap between adjacent fields in a video signal.

FIG. 4B illustrates a gap between consecutive declared matches in an exemplary field sequence. A declared match is generated for a field n as indicated by the field-match value z[n]=1. The next declared match occurs for field n+4 as indicated by the field-match value z[n+4]=1. The gap between the successive matches in this example is four. A running gap is a gap which repeats itself over a sequence of fields. The grouper 70 utilizes gaps and running gaps to determine appropriate field groupings.

A running gap of length one ending just before a non-match field is indicative of an interval of fields corresponding to consecutive frames of telecine material. The variable "interval_length" indicates the length of an interval determined to have a running gap of length one. If (interval_length mod 3)=0, field grouper 70 groups consecutive fields of three for the entire interval. If (interval_length mod 3)=1, field grouper 70 groups a pair of fields at the beginning of the interval, then another pair of fields, then consecutive fields of three for the remainder of the interval. If (interval_length mod 3)=2, field grouper 70 groups a pair of fields at the beginning of the interval, then consecutive fields of three for the remainder of the interval.

Gaps of length two or more are treated in the following manner. If the gap is even, the field grouper 70 groups consecutive fields of two until the next declared match. If the gap is odd, the field grouper 70 groups three consecutive fields and then pairs of fields until the next declared match. The first two fields of three-field groups comprise a frame for encoding while the third is a repeat field to be dropped. The field grouper 70 may therefore set a repeat-first-field flag for such a three-field group to a value of one, while setting the repeat-first-field flag for two-field groups to zero. The field grouper 70 may also set top-field-first flags for each group to indicate the parity of the first field in the group.

Figure 5A:
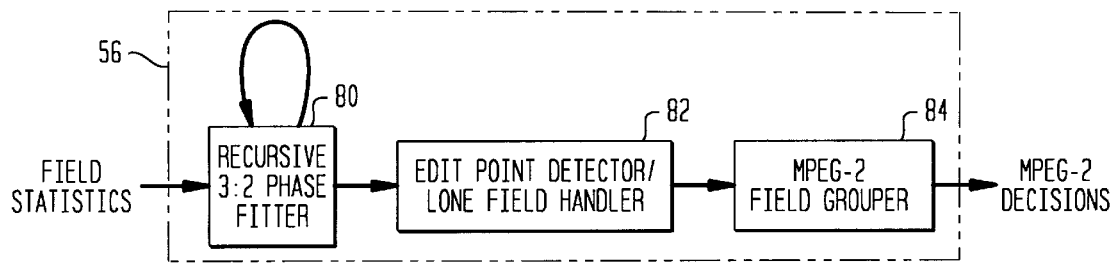
FIG. 5A is a block diagram of an exemplary inverse telecine decider in accordance with a second exemplary embodiment of the invention.

FIG. 5A shows an inverse telecine decider 56 in accordance with a second exemplary embodiment of the invention. The exemplary decider 56 is particularly well-suited for detelecine of film-only telecine material in MPEG-2 applications. The decider 56 includes a recursive 3:2 phase fitter 80, an edit point detector/lone field handler 82 and an MPEG-2 field grouper 84. The operation of the decider 56 is as follows. The recursive 3:2 phase fitter 80 receives the field statistics from the statistics computer 54 and first attempts to fit a single most likely 3:2 pattern or phase through an interval from the start to the end of the entire input field sequence. If the interval cannot be fit with a single uniform phase, then the phase fitter 80 identifies the most likely edit point within the interval in a manner to be described in greater detail below. The phase fitter 80 bisects the interval at the identified edit point into two subintervals. The phase fitter 80 then attempts to fit a single 3:2 phase to each of the subintervals. The process of attempting to fit single 3:2 phases and identifying likely edit points is then repeated recursively until the entire sequence can be partitioned into subsequences with consistent phases that delimit the edit points in the source telecine material.

Figure 5B:
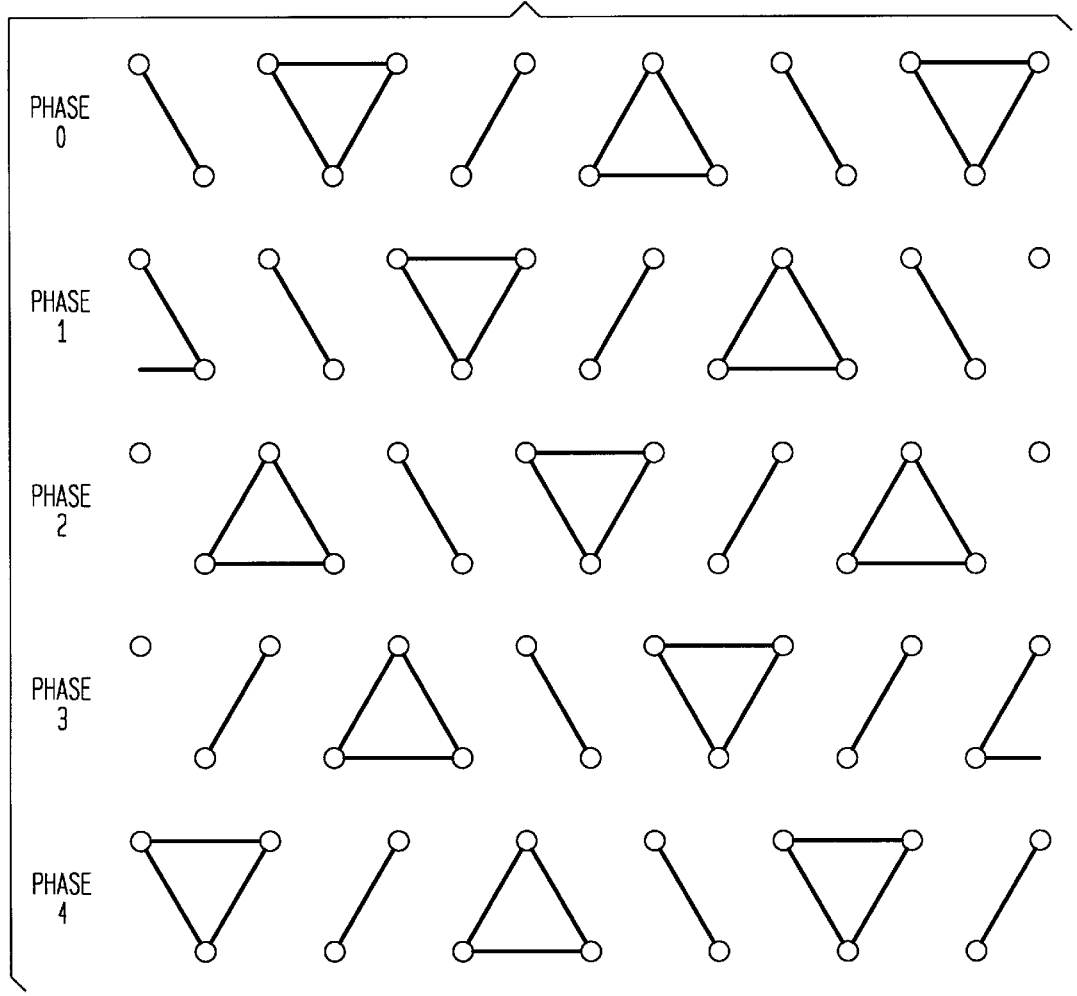
FIG. 5B illustrates the five possible phases of a conventional 3:2 pulldown pattern.

FIG. 5B illustrates the five possible phases 0 through 4 of a given 3:2 pulldown pattern. The phases which the recursive 3:2 phase fitter 80 attempts to fit to the sequence and subsequences are selected from these five phases. Each phase 1 through 4 is shifted by one additional field to the right relative to the first phase 0. It can be seen that a shift of another additional field after phase 4 would not result in another unique phase, because it would produce the same phase as phase 0. There are thus only five possible unique phases in a regular 3:2 pulldown pattern.

After the recursive phase fitting process is completed, the edit point detector/lone field handler 82 detects the edit points determined by the recursive phase fitter 80. The exact edit points are determined in a manner to be described below in conjunction with FIG. 7. Any lone fields are treated by either eliminating them or by absorbing them into a frame for encoding. The MPEG-2 field grouper 84 groups the fields in the sequence into frames and generates an MPEG-2 telecine decision list. The field grouper 84 may be implemented as a simplified version of the field grouper 70 described above in conjunction with FIG. 4A.

Figure 6A:
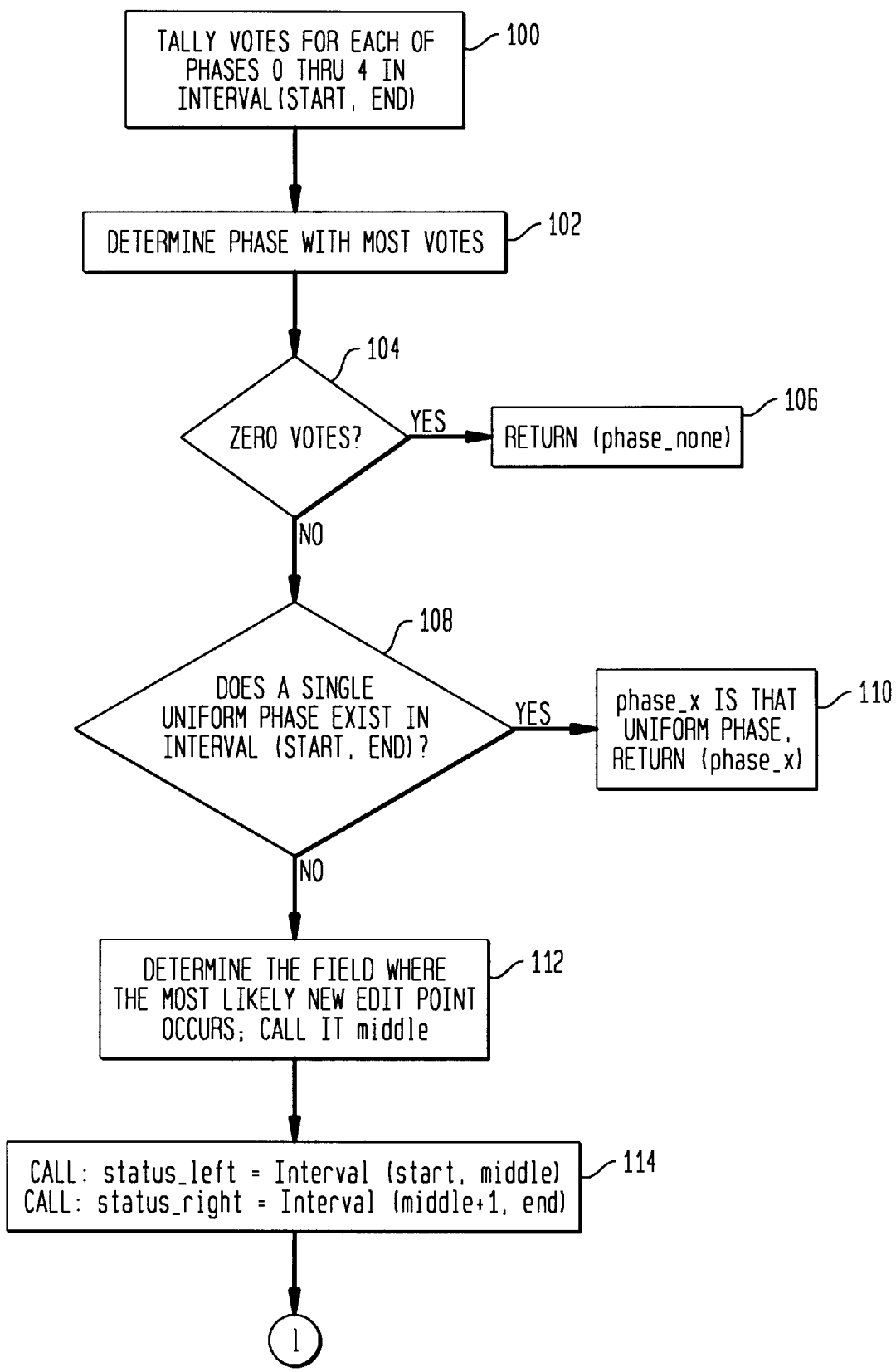
FIGS. 6A and 6B are flow diagrams illustrating the operation of the 3:2 phase fitter of the inverse telecine decider of FIG. 5A.
Figure 6B:
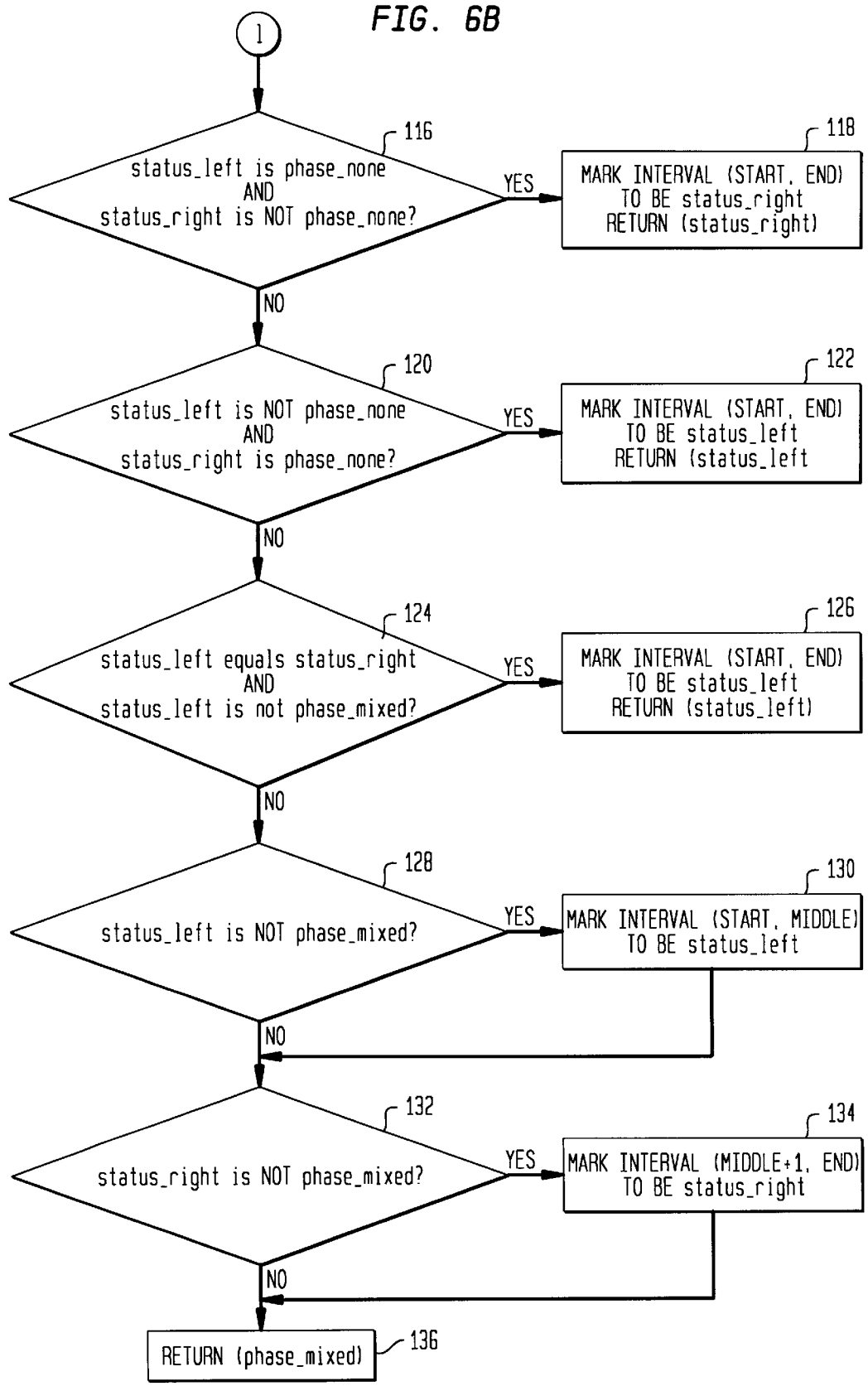

FIGS. 6A and 6B comprise a flow diagram illustrating the operation of the recursive phase fitter 80 of FIG. 5. The recursion function is called as interval(start,end) and is entered with the starting and ending fields of a particular interval in the field sequence. For each field i within the interval, the field correlation metric c[i] is computed in the manner described above in conjunction with FIG. 4A. A uniform 3:2 pulldown pattern for the interval may be in one of the five phases 0 through 4 as shown in FIG. 5B. A value of c[i] greater than a threshold value indicates a strong field match and contributes to a vote for phase(i mod 5). Step 100 indicates that the phase votes for each of the phases 0 through 4 are tallied for all of the fields in interval(start,end). The phase with the most votes is identified in step 102 as the dominant phase. If the dominant phase is determined in step 104 to have zero votes, the interval has no identifiable phase and the function is returned in step 106 as having no phase. This situation may arise in the case of an interval made up of black or motionless scenes.

A determination is then made in step 108 as to whether a uniform phase exists in the interval. An interval is deemed to have a uniform phase in this embodiment if every one of the four non-dominant phases received a vote count less than 0.1% of the total number of fields in the interval. If the phase is uniform over the interval, the function is returned in step 110 as having the dominant phase determined in step 102. If the phase is not uniform over the interval, the most likely edit point in the interval is determined in step 112. The most likely edit point generally occurs within about 6 fields after field[middle] where middle is a field index determined as follows:

$$\text{middle} = \underset{j}{\operatorname{argmax}}(c[j-T] - c[j+T+5])$$

in which c[i] is the correlation metric previously described and the operation "argmax" indicates the value of middle over all j in the interval which maximizes the parenthetical quantity. The original interval is then bisected into (start, middle) and (middle+1,end) subintervals, and recursion calls are made to the interval(start,end) function over these two subintervals.

Steps 116–136 indicate the manner in which return values from the recursion function are used to mark the intervals as having a particular phase. In steps 116, 120, 124, 128 and 132, determinations are made regarding the results of the call to interval (start, middle), referred to as status_left, and the call to interval (middle+1, end), referred to as status_right. The result of a given call may be that the corresponding subinterval has no identifiable phase, as indicated by the designation phase_none, or that the corresponding subinterval has an edit point, as indicated by the designation phase_mixed. If the result of a given call is phase_mixed, the corresponding subinterval is itself separated into two subintervals, and the process of attempting to identify a phase for each subinterval is repeated. The process continues until the identifiable phases of the entire sequence have been determined.

The recursive 3:2 phase fitter 80 marks an interval as having a particular phase by setting a field-match indicator z[i] for each field in the interval:

$$z[j] = 1.0, \text{ if } (j \bmod 5) \text{ equals decided phase}$$
$$0.0, \text{ otherwise}$$

The resulting sequence of z[i] values may not yet be directly convertible to a legal sequence of MPEG-2 repeat field codes. The sequence of z[i] values generally must be conditioned into a legal MPEG-2 repeat field sequence by breaking some of the declared matches or introducing some additional matches to resolve lone fields that may exist at edit points. These operations are performed by the edit point detector/lone field handler 82 of FIG. 5A in the following manner.

Given the last field in an interval indicated as a match, field[last_match], the detector/handler 82 attempts to pinpoint exactly where the edit point occurs. This is done by examining the local region identified in the recursive phase-fitting operation as including a change in 3:2 phase. It is assumed in this example that the true edit point will occur within six fields of field[last_match]. The detector/handler 82 then determines that the edit point occurs immediately after field[edit_index] in which edit_index is given by:

$$\operatorname*{argmax}_{j}(w(\mathrm{diff\_s}[j-1] + \mathrm{diff\_s}[j] + \mathrm{diff\_o}[j]) + \mathrm{abs}(dc[j] - dc[j+1])$$

for j=(last_match+2) to (last_match+6) where w is a weighting factor. The above expression incorporates the fact that the exact edit point is most likely indicated by a scene change, which can be detected either by large values of field difference scores (e.g., diff_s[j−1]+diff_s[j]+diff_o[j]) or by large changes in dc values between two fields (e.g., dc[j]−dc[j+1]). The weighting factor w converts these two different types of metrics into common units, and also weights their relative importance in a decision as to edit point position. A suitable value for w may be selected as a value which provides correct identification of known edit points in a set of training sequences. A value of w on the order of 10/energy(diff_s[j−1], diff_o[j−1], diff_s[j], diff_o[j]), where energy(y1, y2, . . . ) is the square-root of the sum of the squares of y1, y2, . . . , will be suitable for many applications.

Figure 7:
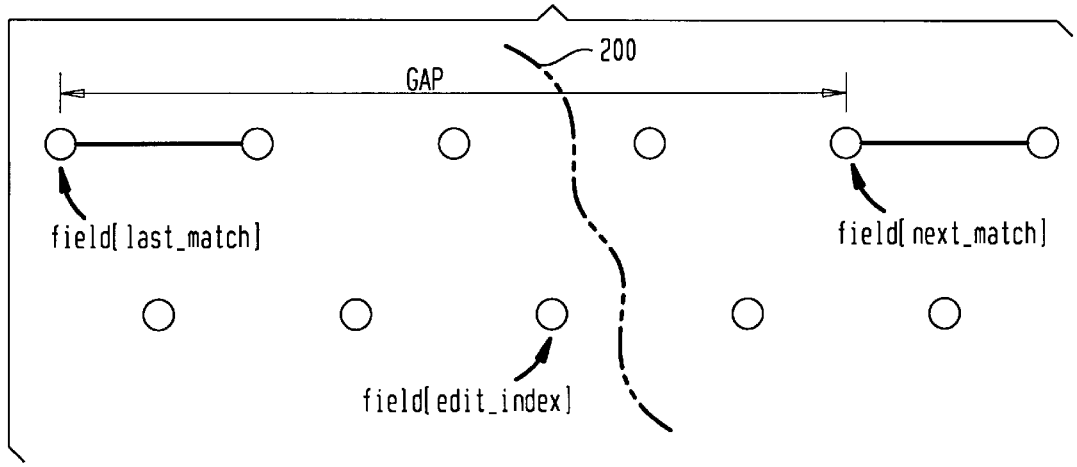
FIG. 7 illustrates the detection of an edit point in accordance with the second exemplary embodiment of the invention.

FIG. 7 illustrates an exemplary sequence of fields with an edit point indicated by a dashed line 200. The last field designated as a match in the interval before the edit point is labelled field[last_match]. The last field before the edit point is labelled field[edit_index]. The first field designated as a match in the interval after the edit point is labelled field[next_match]. A gap is measured as the distance between field[last_match] and field[next_match]. If the gap is even, an unpaired single lone field exists at the edit point. The single lone field is field[edit_index] if (edit_index−last_match) is odd, otherwise the lone field is field[edit_index+1]. The single lone field is handled by examining the match indicator z[edit_index−3]. If this match indicator is set to one, the match is broken by setting z[edit_index−3] to zero. If this match indicator is zero, the single lone field is removed by setting z[edit_index−2] to one.

After completion of the edit point detection and lone field handling operations, the sequence of field-match indicators z[i] will correspond to a legal MPEG-2 repeat field sequence. The MPEG-2 field grouper 84 then simply groups the next three fields when z[i] is set to one, and groups the next two fields if z[i] is set to zero. The first two fields of a three-field group form a frame for encoding while the third field is a repeat field to be dropped. The field grouper 84 can set a repeat-first-flag for such a group to one. Two-field groups form a frame for encoding and the field grouper 84 can set the repeat-first-field flag for such a group to zero. The field grouper 84 can also set top-field-first flags for each group in accordance with the parity of the first field in the group.

The inverse telecine decider 56 of FIG. 5A can also be used for detelecine of film-only telecine material in MPEG-1 applications. The recursive 3:2 phase fitter 80 and detector/handler 82 will operate for MPEG-1 applications in substantially the same manner as that described above for MPEG-2 applications. The MPEG-2 field grouper 84 can be modified as described below to include timing jitter measurement and compensation features useful for performing MPEG-1 field grouping.

A detelecine decision that generates consecutive three-field frames or consecutive two-field frames will generally introduce timing jitter between video and its associated audio in MPEG-1 applications. A lead of 1/120 second is introduced for video relative to audio every time two consecutive three-field frames are encountered. Similarly, a lag of 1/120 second is introduced for video relative to audio every time two consecutive two-field frames are encountered. The accumulated video drift should be kept within a limited range so that audio/video mis-synchronization will remain substantially imperceptible to the human observer. An acceptable accumulated drift range for many applications is about 0 msec to 200 msec of video lead.

An MPEG-1 field grouper in accordance with the present invention operates in substantially the same manner as the MPEG-2 field grouper 84 described above but provides the additional functions of monitoring the amount of video drift that accrues at interval boundaries where a transient irregular 3:2 pattern exists, and handling the exceptional cases when the accumulated drift falls outside the acceptable range.

Figure 8A:
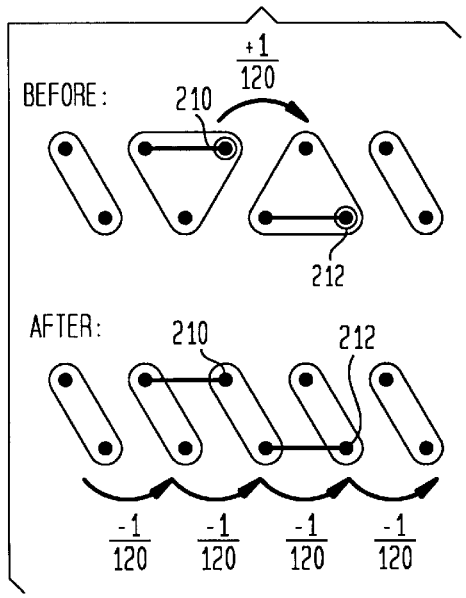
FIGS. 8A and 8B illustrate techniques for limiting video lead and lag in MPEG-1 applications accordance with a third exemplary embodiment of the invention.

FIG. 8A shows the operation of the MPEG-1 field grouper when the accumulated drift exceeds an upper limit on video lead. The "before" portion shows a sequence of even and odd fields designated by dots and grouped into a sequence including a two-field frame, two consecutive three-field frames and another two-field frame. The circled fields 210 and 212 are repeat fields to be dropped prior to encoding. The two consecutive three-field frames are part of a transient irregular 3:2 pattern and introduce a video lead of 1/120 second as shown. Assuming that this additional 1/120 second lead causes the accumulated video drift to exceed an upper limit of 200 msec of lead, the MPEG-1 field grouper will regroup the fields into five consecutive two-field frames as shown in the "after" portion of FIG. 8A. The regrouping introduces an extra video frame for encoding such that the repeat fields 210 and 212 will no longer be dropped. The four consecutive instances of two-field frames each cause a 1/120 second video lag relative to audio as shown. The regrouping thus causes the video to fall behind the audio by an increment of 1/24 second such that the total accumulated drift is again within the acceptable range.

Figure 8B:
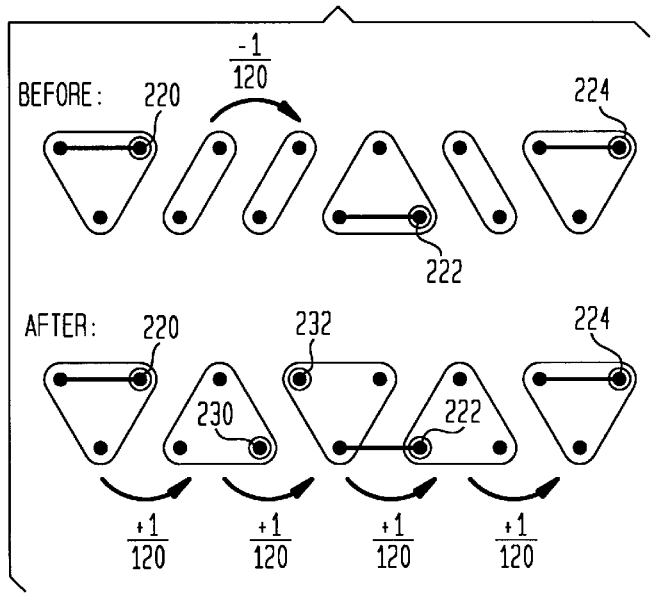

FIG. 8B shows the operation of the MPEG-1 field grouper when the accumulated drift falls below a lower limit and becomes a video lag relative to audio. The "before" portion of FIG. 8B shows a sequence of fields designated by dots and grouped into three-field and two-field frames. The fields 220, 222 and 224 are repeat fields to be dropped prior to encoding. The two consecutive two-field frames in the "before" sequence are part of a transient irregular 3:2 pattern and introduce a video lag of 1/120 second as shown. Assuming that this additional 1/120 second lag causes the accumulated video drift to fall below a lower limit of zero msec of lead, the MPEG-1 field grouper will regroup the fields into five consecutive three-field frames as shown in the "after" portion of FIG. 8B. The regrouping will cause fields 230 and 232 which made up the second frame in the pair of consecutive two-field frames to be dropped as repeat fields prior to encoding. A video frame is in effect removed from the sequence such that the video will again lead the audio. The four consecutive instances of three-field frames each result in a 1/120 second video lead relative to audio as shown. The regrouping thus causes the video to lead the audio by an increment of 1/24 second such that the total accumulated drift is again within the acceptable range. It should be apparent that although the resulting field groupings in the "after" portion of FIG. 8B will generally not exhibit valid repeat-first-field and top-field-first flags for MPEG-2 encoding, the groupings are suitable for MPEG-1 encoding.

The inverse telecine decider 56 of the present invention may be implemented in hardware or software or a combination thereof. For example, the inverse telecine decider may be implemented as a computer, central processing unit, controller, microprocessor, application-specific integrated circuit (ASIC) or other digital data processor programmed to provide the operations described in conjunction with FIGS. 4–8 above.

The above-described embodiments of the invention are intended to be illustrative only. Numerous alternative embodiments within the scope of the appended claims will be readily apparent to those skilled in the art.

I claim:

1. A method for performing inverse telecine processing on a sequence of video fields, at least one of which was generated by a telecine process, wherein, according to the telecine process, two fields or three fields were alternately derived from frames to produce a repeating pattern of 3:2 pull-down fields including an alternating sequence of three fields, derived from one frame, adjacent to two fields, derived from another frame, the method of inverse telecine processing identifying the repeated patterns of 3:2 pull-down fields and comprising the steps of:
(a) attempting to fit one of a plurality of known phases of a repeated pattern of 3:2 pull-down fields to the entire sequence of video fields,
(b) if one of the known phases of a repeated pattern of 3:2 pull-down fields cannot be fit to the sequence uniformly, then:
(b1) determining a likely edit point, where a repeated pattern of 3:2 pull-down fields is disrupted, between a first subsequence of the sequence of video fields and a second subsequence of the sequence of video fields,
(b2) recursively repeating steps (a) and (b) for the first subsequence, and
(b3) recursively repeating steps (a) and (b) for the second subsequence, until the sequence is represented by a plurality of subsequences, at least a subset of which can be fit with one of the known phases of a repeated pattern of 3:2 pull-down fields,
wherein a concatenation of the first and second subsequences forms the entire sequence, step (a) being applied to the first and second subsequences prior to performing steps (b2) and (b3) so that step (a) is performed on each field in the entire sequence at least twice, if one of the known phases cannot be fit to the sequence uniformly.

2. The method of claim 1 wherein the plurality of known patterns includes five possible phases of a 3:2 pulldown pattern.

3. The method of claim 2 wherein the step of attempting to fit one of a plurality of known patterns to the sequence further includes the steps of:
computing a correlation metric $c[i]$ for each of a plurality of fields in the sequence; and
counting a vote for phase ($i$ mod 5) if $c[i]$ is greater than a threshold value;
assigning as a dominant phase for the sequence to one of the five possible phases receiving the most votes; and
indicating that none of the five phases can be fit to the sequence if no phase receives any votes.

4. The method of claim 3 wherein the step of attempting to fit one of a plurality of known patterns to the sequence further includes the step of indicating that one of the phases can be fit to the sequence if each of the remaining phases receive a vote count less than a percentage of the total number of fields in the sequence.

5. The method of claim 1 wherein the step of determining a likely edit point in the sequence if one of the known patterns cannot be fit to the sequence further includes the step of identifying a field index which maximizes the quantity:

$$(c[j-T]-c[j+T+5])$$

over $j$ fields in the sequence, where $c[i]$ is a correlation metric for a given field and $\pm T$ defines the size of a window of fields over which the correlation metrics are determined.

6. The method of claim 1 further including the step of using the known patterns fit to the sequence and any subsequences to set field-match indicators for fields in the sequence.

7. The method of claim 6 wherein the plurality of known patterns includes five possible phases of a 3:2 pulldown pattern and wherein the step of using the known patterns to set field-match indicators for fields in the sequence further includes the steps of:
setting the field match indicator $z[j]$ to one if the quantity ($j$ mod 5) corresponds to the one of the five possible phases fit to the sequence or subsequence including field $j$; and
setting the field match indicator $z[j]$ to zero if the quantity ($j$ mod 5) does not correspond to the one phase.

8. The method of claim 6 further including the step of converting the field-match indicators into a sequence of legal MPEG-2 repeat field codes.

9. The method of claim 8 further including the step of identifying an edit point in the sequence or subsequence as a field index which maximizes a quantity including a sum of at least one difference score and an average value change for adjacent fields in the sequence or subsequence.

10. The method of claim 6 further including the step of converting the field-match indicators into a sequence of legal MPEG-1 repeat field codes.

11. The method of claim 1 wherein step (a) further comprises the step of identifying a lone field of a particular frame, and wherein the video sequence is devoid of any other fields derived from that particular frame.

12. The method of claim 1 wherein each of the first and second subsequences comprises at least one field.

13. The method of claim 1 wherein the likely edit point is less than one field interval from each of the first and second subsequences.

14. An inverse telecine decider for identifying the repeated patterns of 3:2 pull-down fields in a sequence of video fields, at least one subsequence of which was generated by a telecine process, wherein, according to the telecine process, two fields or three fields were alternately derived from frames to produce a repeating pattern of 3:2 pull-down fields, including an alternating sequence of three fields, derived from one frame, adjacent to two fields, derived from another frame, the inverse telecine decider comprising:

(a) an input for receiving statistics gathered on a sequence of video fields, and (b) a recursive 3:2 phase fitter responsive to the received statistics for attempting to fit one of a plurality of known phases of a repeated pattern of 3:2 pull-down fields to the entire sequence of video fields, and for, if one of the known patterns of phases of a repeated pattern of 3:2 pull-down fields cannot be fit to the sequence uniformly, then:

determining a likely edit point, where a repeated pattern of 3:2 pull-down fields is disrupted, between a first subsequence of the sequence of video fields and a second subsequence of the sequence of video fields, and recursively repeating to attempt to fit one of the plurality of known phases and determining a likely edit point to each of the first and second subsequences, until the sequence is represented by a plurality of subsequences, at least a subset of which can be fit with one of the known phases of a repeated pattern of 3:2 pull-down fields, wherein a concatenation of the first and second subsequences forms the entire sequence, the recursive 3:2 phase fitter attempting to fit one of the known phases to the first and second subsequences prior to determining the likely edit point and repeating to attempt to fit one of the plurality of known phases to each of the first and second subsequences, so that the inverse telecine decider attempts to fit one of the known phases to each field in the entire sequence at least twice, if one of the known phases cannot be fit to the sequence uniformly.

15. The inverse telecine decider of claim 14 wherein the recursive 3:2 phase fitter further identifies a lone field of a particular frame, and wherein the video sequence is devoid of any other fields derived from that particular frame.

16. The inverse telecine decider of claim 14 wherein each of the first and second subsequences comprises at least one field.

17. The inverse telecine decider of claim 14 wherein the likely edit point is less than one field interval from each of the first and second subsequences.

18. A signal generated by performing inverse telecine processing on a sequence of video fields, at least one subsequence of which was generated by a telecine process, wherein, according to the telecine process, two fields or three fields were alternately derived from frames to produce a repeating pattern of 3:2 pull-down fields including an alternating sequence of three fields, derived from one frame, adjacent to two fields, derived from another frame, the method of inverse telecine processing identifying the repeated patterns of 3:2 pull-down fields and comprising the steps of:

(a) attempting to fit one of a plurality of known phases of a repeated pattern of 3:2 pull-down fields to the entire sequence of video fields, (b) if one of the known phases of a repeated pattern of 3:2 pulldown fields cannot be fit to the sequence uniformly, then:

(b1) determining a likely edit point, where a pattern of 3:2 pull-down fields is disrupted, between a first subsequence of the sequence of video fields and a second subsequence of the sequence of the sequence of video fields, (b2) recursively repeating steps (a) and (b) for the first subsequence, and (b3) recursively repeating steps (a) and (b) for the second subsequence, until the sequence is represented by a plurality of subsequences, at least a subset of which can be fit with one of the known phases of a repeated pattern of 3:2 pull-down fields, wherein a concatenation of the first and second subsequences forms the entire sequence, step (a) being applied to the first and second subsequences prior to performing steps (b2) and (b3) so that step (a) is performed on each field in the entire sequence at least twice, if one of the known phases cannot be fit to the sequence uniformly.

19. The signal of claim 18 wherein step (a) further comprises the step of identifying a lone field of a particular frame, and wherein the video sequence is devoid of any other fields derived from that particular frame.

20. The signal of claim 18 wherein each of the first and second subsequences comprises at least one field.

21. The signal of claim 18 wherein the likely edit point is less than one field interval from each of the first and second subsequences.

* * * * *